(12) United States Patent
Bettati

(10) Patent No.: US 9,340,359 B2
(45) Date of Patent: May 17, 2016

(54) LINK USABLE IN A CONVEYOR BELT AND A PROCESS FOR MAKING SUCH A LINK

(71) Applicant: Tienno Bettati, Reggio Emilia (IT)

(72) Inventor: Tienno Bettati, Reggio Emilia (IT)

(73) Assignee: BETT SISTEMI S.R.L., Carpi (Modena) (IT)

( * ) Notice: Subject to any disclaimer, the term of this patent is extended or adjusted under 35 U.S.C. 154(b) by 0 days.

(21) Appl. No.: 14/381,122

(22) PCT Filed: Feb. 28, 2013

(86) PCT No.: PCT/IB2013/051609
§ 371 (c)(1),
(2) Date: Aug. 26, 2014

(87) PCT Pub. No.: WO2013/128408
PCT Pub. Date: Sep. 6, 2013

(65) Prior Publication Data
US 2015/0034459 A1    Feb. 5, 2015

(30) Foreign Application Priority Data

Feb. 28, 2012  (IT) .............................. BO2012A0091

(51) Int. Cl.
*B65G 17/40*    (2006.01)
*B65G 15/32*    (2006.01)
(Continued)

(52) U.S. Cl.
CPC ............ *B65G 15/32* (2013.01); *B29C 37/0053* (2013.01); *B65G 17/40* (2013.01); *B29K 2059/00* (2013.01); *B29K 2077/00* (2013.01)

(58) Field of Classification Search
CPC .............................. B65G 17/42; B65G 17/26
USPC ........................................ 198/850–853, 617
See application file for complete search history.

(56) References Cited

U.S. PATENT DOCUMENTS 4,438,838 A * 3/1984 Hodlewsky et al. .......... 198/853
5,323,893 A * 6/1994 Garbagnati ................ 198/690.2
(Continued)

FOREIGN PATENT DOCUMENTS

| EP | 0 172 745 A1 | 2/1986 |
| EP | 1 593 616 A1 | 11/2005 |
| WO | 98/14396 A1 | 4/1998 |

OTHER PUBLICATIONS

International Search Report, dated Jun. 14, 2013, from corresponding PCT application.

*Primary Examiner* — Douglas Hess
(74) *Attorney, Agent, or Firm* — Young & Thompson

(57) ABSTRACT

A link, usable in a conveyor belt of the type with articulated links, includes a main link supporting member, in particular of plastic material, more specifically a rigid or substantially rigid material such as acetalic resin or polyamide, and a secondary or product engagement member, in particular of elastically compliant material, preferably an elastic or elastomeric material, and in particular defining a product supporting member defining a corresponding surface for supporting the product to be conveyed. Fastening elements are provided by which the secondary or product engagement member is fastened to the main link supporting member, and which include, on the secondary member, corresponding protruding elements adapted to be inserted into a respective socket formed in the main link supporting member, the socket defining corresponding perpendicular retaining undercut elements for holding the secondary or product engagement member to the selfsame main link supporting member.

24 Claims, 6 Drawing Sheets

(51) Int. Cl.
  *B29C 37/00*   (2006.01)
  *B29K 59/00*   (2006.01)
  *B29K 77/00*   (2006.01)

(56) References Cited

U.S. PATENT DOCUMENTS

| | | | | |
|---|---|---|---|---|
| 5,361,893 A * | 11/1994 | Lapeyre et al. | ............... | 198/853 |
| 5,439,097 A | 8/1995 | Takahashi et al. | | |
| 5,497,874 A * | 3/1996 | Layne | ........................... | 198/698 |
| 5,587,218 A * | 12/1996 | Betz | ................ | 428/67 |
| 6,880,696 B2 * | 4/2005 | Cediel et al. | ................... | 198/852 |
| 6,948,613 B2 * | 9/2005 | Guldenfels et al. | ........... | 198/853 |
| 7,641,044 B2 * | 1/2010 | Ozaki et al. | ................... | 198/853 |
| 7,802,676 B2 * | 9/2010 | Guldenfels et al. | ........... | 198/853 |
| 8,430,235 B2 * | 4/2013 | Menke et al. | ................. | 198/853 |
| 8,640,859 B2 * | 2/2014 | Ecob | ............................. | 198/793 |
| 8,991,595 B2 * | 3/2015 | Buter | ............................ | 198/853 |
| 2004/0112720 A1 | 6/2004 | Guldenfels et al. | | |
| 2005/0241923 A1* | 11/2005 | Garbagnati et al. | | |
| 2008/0314720 A1* | 12/2008 | Guldenfels et al. | | |

* cited by examiner

LINK USABLE IN A CONVEYOR BELT AND A PROCESS FOR MAKING SUCH A LINK

TECHNICAL FIELD

This invention relates to a link which is usable in a conveyor belt of the type with articulated links.

The invention also addresses a process for making a link which is usable in a conveyor belt of the type with articulated links.

BACKGROUND ART

Known in the prior art are conveyor belts with articulated links, where the link comprises a main supporting member made of a rigid plastic material, in particular acetalic resin, polyamide or the like, and a secondary member, or insert, preferably made of an elastic or elastomeric material, which has an external upper surface for supporting the product to be conveyed and which is received in a respective socket in the main supporting member of the link.

In prior art conveyors, the secondary or product supporting member is held to the main link supporting member by respective fastening means, which are located on the secondary member and on the main link supporting member and which are in the form of corresponding perpendicular protrusions which fit into matching sockets, with perpendicular walls, formed in the main supporting member.

Disadvantageously, however, in links of this kind, referred to as rubberized, the secondary or product engagement member tends to become detached from the main link supporting member.

This problem is particularly serious when the conveyor is used for transporting certain products, in particular products which are thin and stiff, which tend to get caught under the secondary product engagement member, creating leverage which prises it off the main link supporting member. For example, in the pharmaceutical industry, the blister pack which contains the pharmaceutical and which is normally a stiff plate of layered plastic, easily finds its way between the rubberized secondary member and the main link supporting member, which is made of a rigid plastic material, causing the secondary member to become detached.

In practice, the perpendicular protrusions of the prior art, which extend perpendicularly from the underside of the insert, or secondary product engagement member, are not effective enough in holding the secondary or product engagement member to the main link member.

To overcome this problem, a layer of adhesive has been applied between the underside of the inserts or supporting members of elastomeric material and the corresponding surface of the rigid supporting member. The results, however, have been unsatisfactory especially because of the low durability of the adhesiveness between the link members.

Moreover, up to the present, the protrusions, extending perpendicularly from the secondary or product engagement member and fitting into matching perpendicular sockets in the main link, have been formed by a process whereby the main link supporting member is made of a respective rigid material, such as acetalic resin, polyamide or the like, in a corresponding mould provided with perpendicular cavities, and the elastomeric insert then moulded directly onto the main link supporting member, thus forming the perpendicular fastening protrusions inside the perpendicular sockets formed in the main link supporting member.

SUMMARY OF THE INVENTION

This invention proposes a new solution alternative to the solutions known to the state of the art and, more specifically, a solution which can overcome one or more of the above mentioned drawbacks or problems and/or satisfy one or more of the needs which are felt in the trade and which, in particular, may be inferred from the above description of the prior art.

It is accordingly provided a link usable in a conveyor belt of the type with articulated links, the link having a main link supporting member, in particular of plastic material, more specifically a rigid or substantially rigid material such as acetalic resin, polyamide or the like, and a secondary or product engagement member, in particular of elastically compliant material, preferably an elastomeric material, and in particular defining a product supporting member having a corresponding surface for supporting the product to be conveyed; the secondary or product engagement member being held to the main link supporting member by respective fastening means on the secondary or product engagement member and on the main link supporting member, respectively, characterized in that the fastening means comprise, on the secondary or product engagement member, corresponding protruding means, adapted to be inserted into a respective socket formed in the main link supporting member and defining corresponding perpendicular retaining undercut means for holding the secondary or product engagement member to the selfsame main link supporting member.

Thus, links are obtained which are provided with a respective secondary or product engagement member, in particular in the form of a respective supporting member, where the secondary or product engagement member is effectively fastened to the main link supporting member and does not run the risk of becoming detached therefrom.

It is also provided an advantageous process for making a link usable in a conveyor belt of the type with articulated links, the link having a main link supporting member, in particular of plastic material, more specifically a rigid or substantially rigid material such as acetalic resin, polyamide or the like, and a secondary or product engagement member, in particular of elastically compliant material, preferably an elastomeric material, and in particular defining a product supporting member having a corresponding surface for supporting the product to be conveyed; in particular, the secondary or product engagement member being held to the main link supporting member by respective fastening means on the secondary or product engagement member and on the main link supporting member, respectively; characterized in that it comprises making a secondary or product engagement member, in particular comprising corresponding protruding means defining respective fastening means on the secondary or product engagement member, and making the main link supporting member in contact with the secondary or product engagement member, in particular in such a way as to obtain in the main link supporting member at least one corresponding socket for housing the protruding means, especially defining corresponding perpendicular retaining undercut means for holding the secondary or product engagement member to the selfsame main link supporting member.

Thus provided is an advantageous, alternative process for making a respective link and which, in particular, allows better adhesion of the secondary member to the main member of the link, especially thanks to the provision of a socket defining a respective undercut for retaining a corresponding protrusion of the secondary member.

BRIEF DESCRIPTION OF THE DRAWINGS

These and other innovative aspects are set out in the appended claims and the technical features and advantages are also apparent from the detailed description which follows of a preferred, advantageous embodiment of it which must be considered purely as a non-limiting example. The description is made with reference to the accompanying drawings, in which:

DETAILED DESCRIPTION OF A PREFERRED EMBODIMENT

Figure 1A:
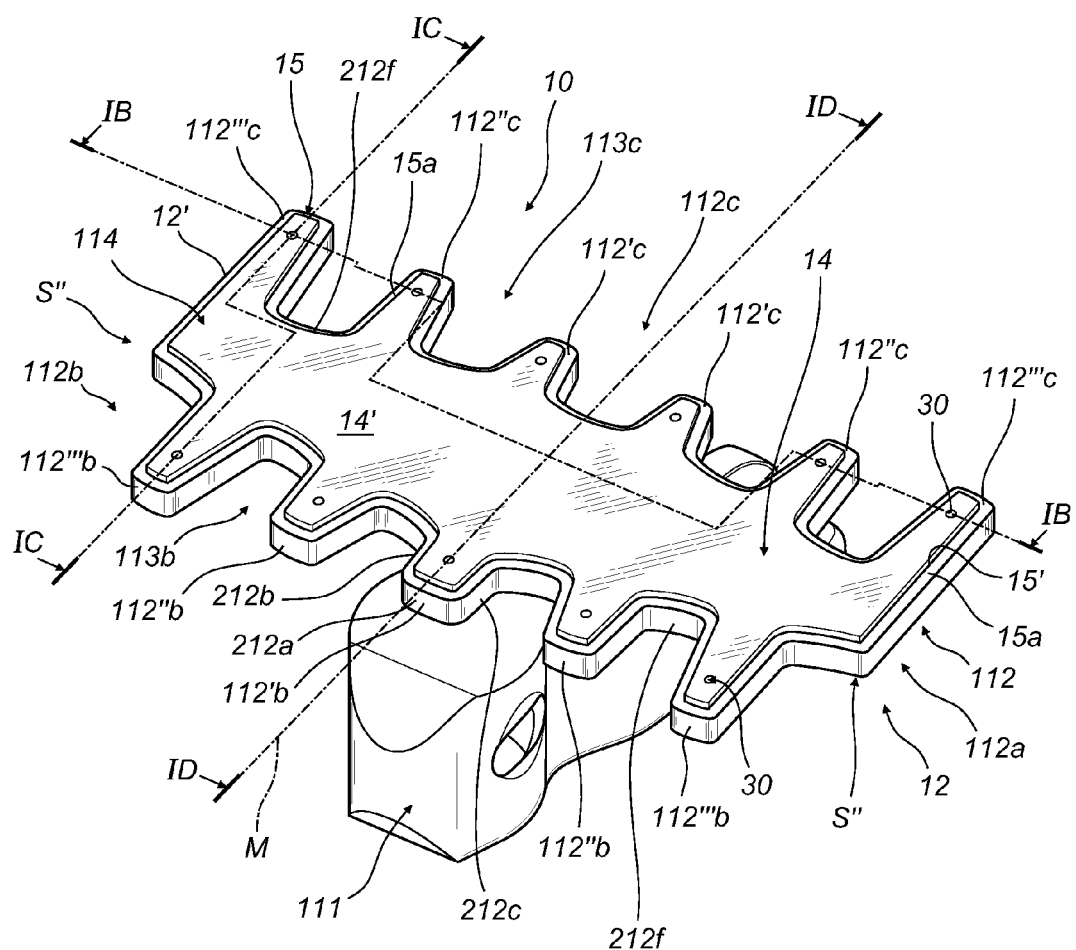
FIG. 1A is a perspective view of a preferred embodiment of the link according to this invention.
Figure 1B:
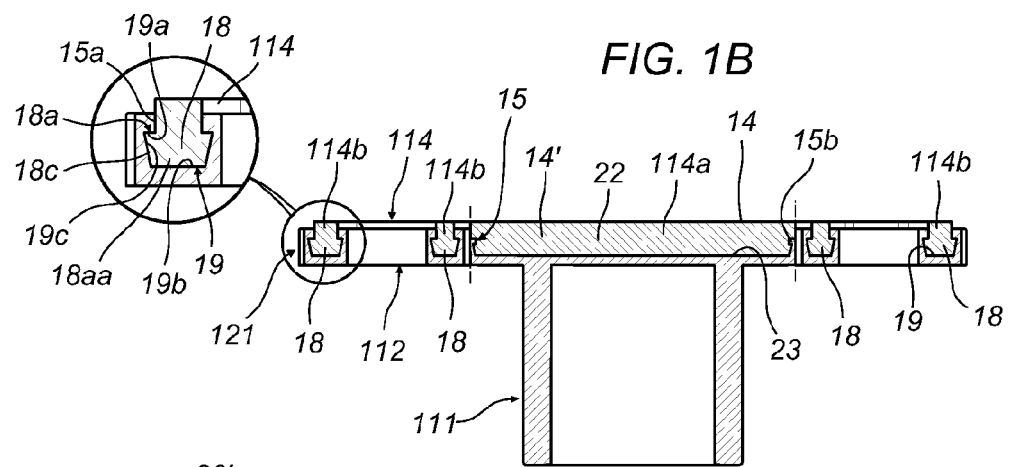
FIG. 1B is a cross section of the preferred embodiment of the link according to the invention, through the line IB-IB of FIG. 1A.
Figure 1C:
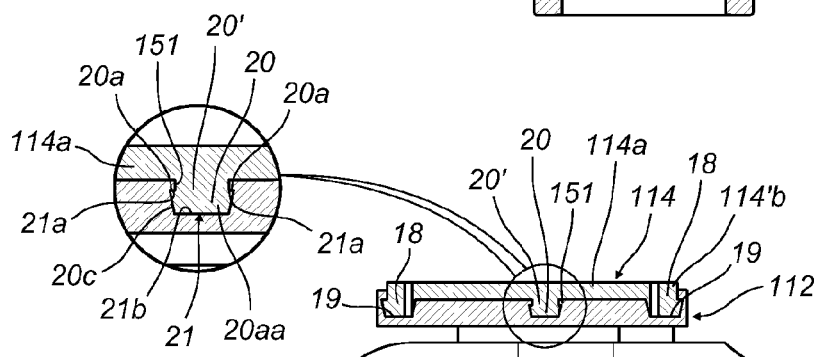
FIG. 1C is a cross section of the preferred embodiment of the preferred embodiment of the link according to the invention, through the line IC-IC of FIG. 1A.

FIGS. 1A to 1D illustrate a preferred embodiment 10 of a link usable in a conveyor belt with articulated links.

As illustrated, the link 10 defines an upper engagement or supporting surface for the product conveyed and means for articulation with the other links of the conveyor.

The link 10 comprises a link supporting member 12, in particular of plastic material, more specifically a rigid or substantially rigid material such as acetalic resin, polyamide or the like.

The supporting member 12 in turn comprises a bottom portion 111 for articulation with the adjacent conveyor links, upstream and downstream, and in particular, adapted to provide a cardanic articulation which is integral with a transversely extended plate 112 constituting the supporting part of the link.

The bottom articulation portion 111 of the link is made in a way which is substantially known to an expert in the trade and is therefore not described in detail.

The link 10 further comprises a secondary or product engagement member 14 which is, in particular, made of elastically compliant material, preferably an elastomeric material. The secondary member 14 preferably defines a corresponding supporting element having a respective upper or external surface 14' for supporting the product to be conveyed and, in particular, defining the main part of the product engagement or supporting surface of the link.

Preferably, as illustrated, the secondary or product engagement member 14, is housed in a respective cavity 15, which is recessed relative to the upper surface 12' of the main link supporting member 12, and is peripherally delimited by a suitably shaped, respective internal perimeter face 15' of a corresponding peripheral edge 15a of the main link supporting member 12.

Figure 3:
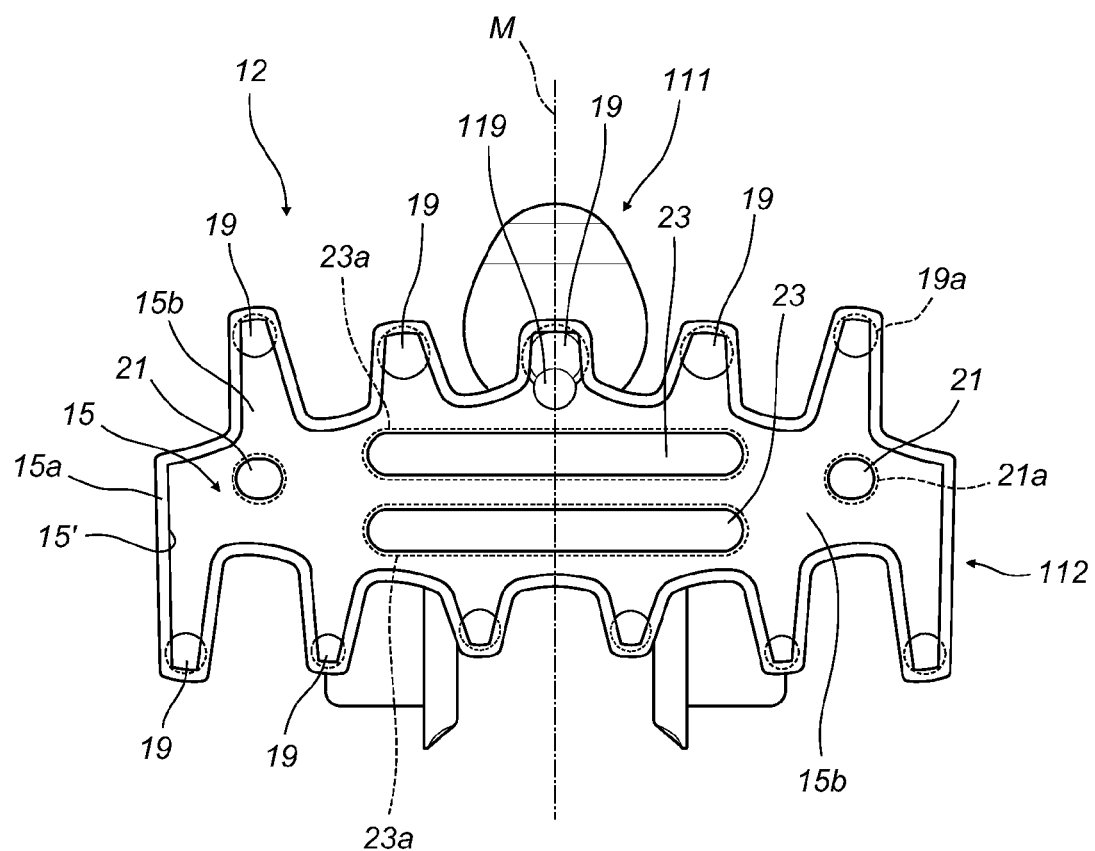
FIG. 3 is a top plan view of only the link supporting member of the link according to the invention.

As may be inferred in particular from FIG. 3, the cavity 15 also comprises a perpendicular bottom surface 15b, which is perpendicularly recessed relative to the external upper surface 12' of the main link supporting member 12.

As may be inferred in particular from FIGS. 2A to 2F, the secondary product engagement member, or insert 14, in turn has a suitably shaped external peripheral edge 14a which mates with the corresponding internal peripheral edge 15a delimiting the housing cavity 15.

As illustrated, the secondary product engagement member, or insert, 14 protrudes upwardly from the main supporting member 12.

The secondary or product engagement member 14 is held to the main member 12, or main supporting member of the link by respective fastening means on the secondary or product engagement member and on the main link supporting member 12, respectively;

As illustrated, the secondary or product engagement member 14 has a main, transversely widened part 114, in particular, transversely widened substantially across the full width of the upper transversal plate 112 of the main link supporting member 12 it is associated with, and a plurality of front longitudinal protrusions 114b, and rear longitudinal protrusions 114c.

The longitudinal protrusions 114b, 114c extend from the main transversal portion 114a and are offset from each other along the longitudinal or feed direction.

As may be inferred from FIG. 1A, the longitudinal protrusions 114b, 114c of the secondary or product engagement member 14 are positioned, in the link, at similar front and rear longitudinal protrusions 112b, 112c of the upper plate of the main link supporting member, which are also longitudinally offset from each other.

More specifically, as illustrated, the main transversely extended portion 114a of the secondary member, or insert, and the corresponding portion 112a of the plate 112 of the main link supporting member have the general shape of a lozenge having respective corner portion S', S", in particular at transversely opposite front ends of the main transversely extended portions 114a, 112a.

In particular, as illustrated, the respective front and rear longitudinal protrusions 114b, 114c of the secondary or product engagement member 14 and the longitudinal protrusions 112b, 112c of the upper plate of the main link supporting member have corresponding lateral longitudinal flanks 214b, 214c and 212b, 212c, respectively, which converge towards each other in the direction of the free end of the respective longitudinal protrusion.

Further, the respective front and rear longitudinal protrusions 114b, 114c of the secondary or product engagement member 14 and the longitudinal protrusions 112b, 112c of the upper plate of the main link supporting member have a transversal end surface 214a and 212a.

In particular, as illustrated, the secondary member and the main member of the link have, at the front, a central protrusion 114'b, 112'b, laterally of each of which there is a pair of intermediate protrusions 114"b, 114"b and 112"b, 112"b, and laterally or externally of these, there are front end protrusions 114'''b, 114'''b and 112'''b, 112'''b.

As illustrated, the front central protrusions 114'b, 112'b are larger in width than the intermediate front longitudinal protrusions 114"b, 112"b, which are in turn larger in width than the external or end protrusions 114'''b, 112'''b.

Further, the secondary member and the main member of the link have, respectively, a pair of central rear longitudinal protrusions 114'c, 114'c and 112'c, 112'c, externally of each of which there is a pair of intermediate protrusions 114"c, 114"c and 112"c, 112"c, and, externally of these, corresponding longitudinal end protrusions 114'''c, 114'''c and 112'''c, 112'''c, the latter protrusions defining the lateral flanks of the product supporting plate of the link.

As illustrated, the longitudinal protrusions 114b, 114c of the supporting member or insert 14 are, in their entirety, slightly smaller in width than the corresponding front and rear longitudinal protrusions 112b, 112c of the transversal plate of the main supporting member 12 of the link 10.

In practice, as illustrated, also, the front and rear longitudinal protrusions 114b, 114c of the supporting member 14 and the corresponding front and rear longitudinal protrusions of the upper plate 112 of the main supporting member 12 of the link differ in width, in particular, their width decreasing progressively from the central zone towards the lateral flanks of the link.

As illustrated, the longitudinally protruding portions of the supporting plate 112 of the link are alternated with corresponding recessed spaces 113b, 113c, respectively front and rear, having a respective transversal bottom surface 212f and corresponding lateral surfaces or flanks 212b, 212c which diverge from each other and define the lateral flanks of adjacent longitudinal protrusions, or teeth, of the main link supporting member 12.

When the conveyor takes a corresponding curved stretch in the product conveying plane, each end 214a of the longitudinal protrusions comes into contact with the respective bottom transversal face 212f of the respective spaces 113b, 113c.

Advantageously, on the secondary or product engagement member 14 of the link, the fastening means comprise corresponding protruding means which are adapted to be inserted into respective sockets formed in the link supporting member 12 and defining corresponding retaining undercut means, in particular, perpendicular retaining undercut means for holding the secondary or product engagement member 14 to the selfsame main link supporting member 12.

In particular, as illustrated, the protruding means 18, 20, 22, extend parallel, or substantially parallel, to the main plane defined by the secondary member.

In particular, the protruding fastening means 18, 20 are situated on the side 14" of the secondary or product engagement member 14 which is perpendicularly opposite the surface 14' for supporting the product.

More in detail, the protruding fastening means 18, 20, 22 extend under the lower face or surface 14" of the secondary or product engagement member 14, perpendicularly opposite the upper surface 14' supporting the product to be conveyed.

In particular, the secondary or product engagement member 14 has a respective lower surface 14" which engages the bottom face 15b of the cavity which houses the insert 14 and which is provided in the main link supporting member 12.

Further, as clearly shown in the drawings, the secondary or product engagement member 14 has a main part 114', which has a respective thickness and from which the protruding fastening means 18, 20, 22 extend downwardly and perpendicularly, the fastening means having a respective height or thickness from the lower face 14" of the main part 114'.

As illustrated, each retaining socket 19, 21, 23 on the main supporting member has a respective recessed surface adapted to define corresponding undercut means and adapted to engage a corresponding opposed surface of the protruding fastening means of the secondary or product engagement member 14.

In particular, also each of the undercut surfaces, labelled 19a, 21a, 23a and adapted to engage or come into contact with a corresponding surface 18a, 20a, 22a of the corresponding protruding means 18, 20, 22 extends parallel or substantially parallel to the main plane defined by the secondary member or to the plane defined by the upper plate of the main link member.

In particular, each retaining socket 19, 21, 23 on the main link supporting member 12 has a corresponding face 19a, 21a, 23a which is recessed relative to a corresponding perpendicular edge 15a, 151, 153, which is, in particular, positioned above the surface 19a, 21a, 23a, the surface 19a, 21a, 23a extending, in particular, in a longitudinally and transversely extended plane, that is, in a respective plane which is extended horizontally or parallel to the main plane defined by the secondary member 14 and by the upper plate of the supporting member 12.

Further, the engagement socket 19, 21, 23 on the main link supporting member 12 has a lower, underside surface 19b, 21b, 23b, opposite the recessed undercut surface 19a, 21a, 23a, and which, in particular, extends in a longitudinally and transversely extended plane, that is, in a respective plane which is extended horizontally or parallel to the main plane defined by the secondary member 14 and by the upper plate of the supporting member 12.

The underside surface 19b, 21b, 23b of the respective socket 19, 21, 23 is in contact with a corresponding lower surface 18b, 20b, 22b of the protruding means on the additional element 14, in particular the corresponding lower surface 18b, 20b, 22b being parallel to the recessed surface 18a, 20a, 22a of the protruding means.

As illustrated, the upper undercut surface 19a, 21a, 23a of the socket and the lower underside surface 19b, 21b, 23b are, in particular, parallel to each other and are connected to a corresponding surface, in particular an inclined surface converging towards the lower part 19c, 21c, 23c, preferably extending peripherally, this peripheral connecting surface 19c, 21c, 23c of the retaining socket mating and coming into contact with the peripheral profile 18c, 20c, 22c of a corresponding protruding portion 18, 20, 22.

The peripheral surfaces 18c, 20c, 22c of the protruding element join the upper surfaces 18a, 20a, 22a and the lower surfaces 18b, 20b, 22b of the corresponding protruding fastening means 18, 20, 22 on the secondary or product engagement member 14 of the link.

In particular, the respective protruding fastening means define respective perpendicular point protuberances 18, 20 provided at the end of the respective longitudinal protuberance 114b, 114c and in the vicinity of the angled or end corner portion S' of the main part 114a of the secondary member 14 of the link, that is, one or more respective transversely extended perpendicular protuberances 22 at the central part of the main part 114a of the secondary link member 14, as will become clearer as this description continues.

Advantageously, each socket 19, 21, 23 on the main supporting member 12 extends perpendicularly to a height below the level of the bottom face 15b of the cavity 15 of the main supporting member which houses the supporting element 14.

In particular and advantageously, as illustrated and as mentioned above, the protruding means 18 are provided at the free end of a respective longitudinally protruding portion 114b, 114c of the supporting element or insert 14.

In particular, as illustrated, the protruding means 18 are provided at each of the front and rear longitudinal protrusions 114*b*, 114*c* of the supporting element 14.

The protruding means 18 extend outwardly relative to the corresponding peripheral edge 214*a*, 214*b*, 214*c* of the supporting element and are adapted to be inserted into a corresponding socket 19 which is provided on the main link supporting member 12 and which, in particular, is recessed relative to an internal edge 15*a* delimiting the respective housing cavity 15 of the supporting element.

In practice, as illustrated, at each longitudinal protrusion 112*b*, 112*c* of the main supporting member 12 or of the transversal plate 112 thereof, a corresponding raised edge 15*a* is provided which mates with the profile of the corresponding longitudinal protrusion 114*b*, 114*c* of the longitudinal supporting element 14.

Each longitudinal protrusion 114*b*, 114*c* rests at the bottom of it on a corresponding bottom portion 15*b* delimiting the bottom of the cavity 15, at the bottom portion of which 15*b*, in particular, at the respective end thereof, there is a respective socket 19 for housing the protruding element 18.

The socket 19 for housing the protruding element 18 is perpendicularly recessed relative to the bottom surface 15*b* and also relative to the face 15' of the edge 15*a* facing the perpendicular edge delimiting the respective longitudinal protrusion of the secondary member.

As illustrated and mentioned above, the fastening means also have respective protruding means 20 which are provided on the main transversely extended portion 114*a* of the secondary member 14, in particular in the vicinity of a respective corner portion S' thereof, especially situated at the front and lateral edge of the selfsame transversely extended portion 114*a* of the supporting element 14.

As illustrated, a first and a second protrusion 20, 20 are provided in the vicinity of transversely opposite corner portions S', S' of the transversely extended central portion 114*a* of the secondary member, in particular at the front and lateral edges of the selfsame transversely extended main portion 114*a* of the supporting element 14.

Further, the respective protrusion 20 is housed in a corresponding socket 21 provided on the transversely extended main part 112*a* of the plate 112 of the main supporting member 12, in particular in the vicinity of a respective corner portion 8", especially at the front and lateral edge of the transversely extended plate 112*a* of the main link supporting member 12. In particular, the respective socket 21 formed in the main supporting member 12 of the link and housing the respective protrusion 20 of the secondary member, extends under the bottom face 15*b* of the cavity 15 which houses the secondary or product engagement member 14 of the link.

In particular, each socket 21 in the main link supporting member 12 has a narrow upper portion, delimited by an edge, in particular a circumferential edge, 151, and a lower portion which is wider than the narrow portion, the widened portion defining undercut means for the corresponding protruding retaining means 20.

The protruding means 20 are connected to the main part 114', in particular to the transversely extended portion 114*a* thereof, of the secondary member 14 through a corresponding narrow shank 20' which mates with the profile of the narrow edge 151.

As illustrated, the secondary or engagement member 14 also has at least one, in particular a first and a second, protruding fastening portion 22, 22, which are transversely elongate and which fit into at least one, in particular a first and a second, transversely elongate, matching socket 23, 23 in the main link supporting member 12.

Each transversely elongate portion 22, 22 and the respective housing socket 23, 23 thereof are longitudinally aligned and extend along the central zone of the respective member 14 or 12, in particular extending relative to the longitudinal centre line M for substantially half the corresponding lateral part.

Each transversely elongate socket 23, 23 formed in the main supporting member 12 of the link and housing the respective fastening protrusion 21 of the secondary member, extends under the bottom face 15*b* of the cavity 15 which houses the secondary or product engagement member 14 of the link.

In particular, each socket 23 in the main link supporting member 12 has a narrow upper portion, delimited by an edge 153, and a lower portion which is wider than the narrow portion, the widened portion defining undercut means for the corresponding protruding retaining means 22.

The protruding means 22 are connected to the main part 114', in particular to the transversely extended portion 114*a* thereof through a corresponding narrow, transversely elongate portion 22' which mates with the profile of the transversely elongate edge 153 delimiting the narrow upper portion of the socket 23.

In practice and advantageously, the protruding means are defined, in their entirety, by a latching portion 18*bb*, 20', 22' from which a respective protruding fastening portion 18*aa*, 20*aa*, 22*aa* extends, where the protruding fastening portion 18*aa*, 20*aa*, 22*aa* extends along a respective longitudinal and/or transversal direction, in particular lying in a plane parallel to the midplane defined by the main part 114*a* of the secondary member 14.

The latching portion 18*bb*, 20', 22' extends perpendicularly below the transversely extended main part 114*a* of the supporting element 14.

In particular, the latching portion 18*b*, 20', 22' extends perpendicularly from the lower face 14" of the main part 114*a* of the supporting element 14.

In particular, the respective latching portion 18*bb* for the protruding means at the respective front longitudinal protrusion 114*b* and/or rear longitudinal protrusion 114*c*, extends under the selfsame corresponding end portion 114*b*, 114*c*.

In particular, the latching portion 18*bb* extends under the free end of the corresponding protruding end portion 114*b*, 114*c* of the secondary or product engagement member 14 to be retained.

In particular, the respective latching portion 20', 22' extends under the transversely extended part 114*a* of the secondary or product engagement member 14, in particular at or near a corner zone S', S' thereof, and the central zone thereof.

In particular, as may be inferred from the drawings, the protruding fastening portion 20*aa* extends radially from the latching portion 20' to the main part 114' of the secondary or product engagement member of the link.

The protruding fastening means 18, 20 extend circumferentially.

In particular, the protruding fastening portion 20*aa* extends circumferentially from the latching portion 20' to the main part 114' of the secondary or product engagement member of the link.

In particular, the protruding fastening portion 20*aa*, like the protruding fastening portion 22*aa*, is perpendicularly spaced from the lower face 14" of the main part 114' of the additional member 14 of the link.

In particular, the protruding fastening means 20*aa* have a circular outer profile.

At the front central protrusion 114'b, the protruding means 18, and likewise the corresponding sockets 19, are larger in diameter than the protruding means 18 on the intermediate protrusions 114"b, 114"b which are in turn larger in diameter than the protruding means 18 on the front longitudinal end protrusions 114'''b, 114'''b.

Further, at the rear intermediate protrusions 114"c, 114"c, the protruding means 18, and likewise the corresponding sockets 19, are smaller in diameter than the protruding means 18 on the rear central longitudinal protrusions 114'c, 114'c and on the longitudinal end protrusions 114'''c, 114'''c.

Figure 2A:
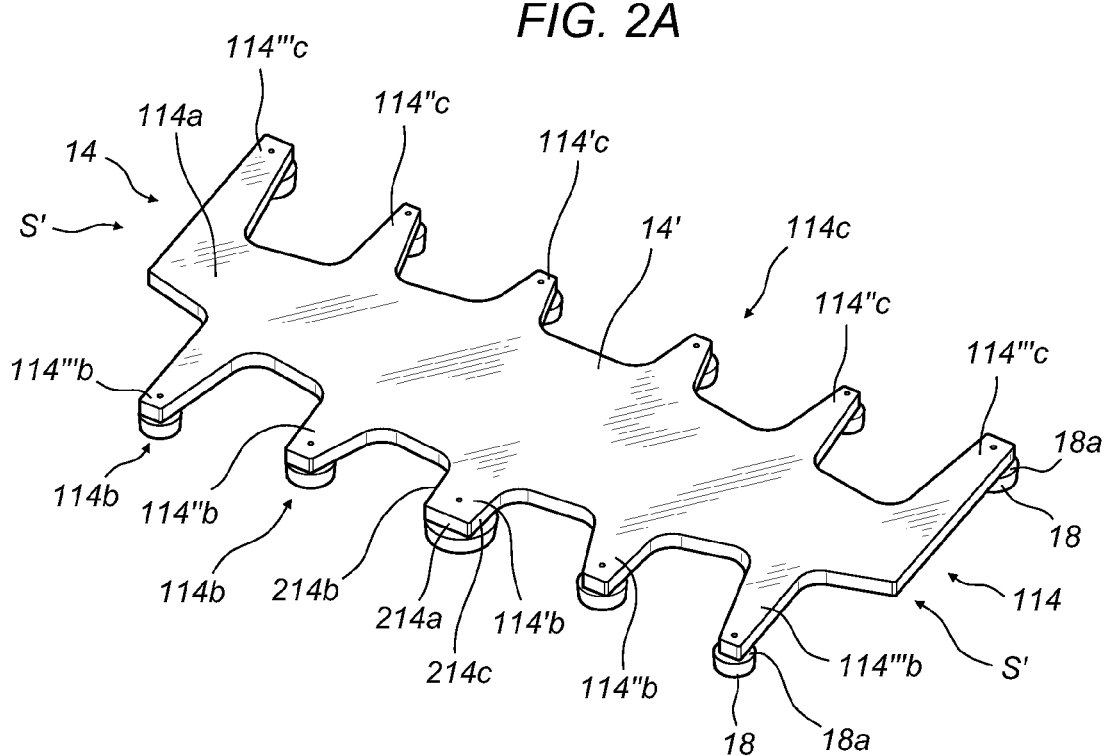
FIG. 2A is a top perspective view of only the preferred embodiment of the secondary or product engagement member used in the link according to the invention.
Figure 2B:
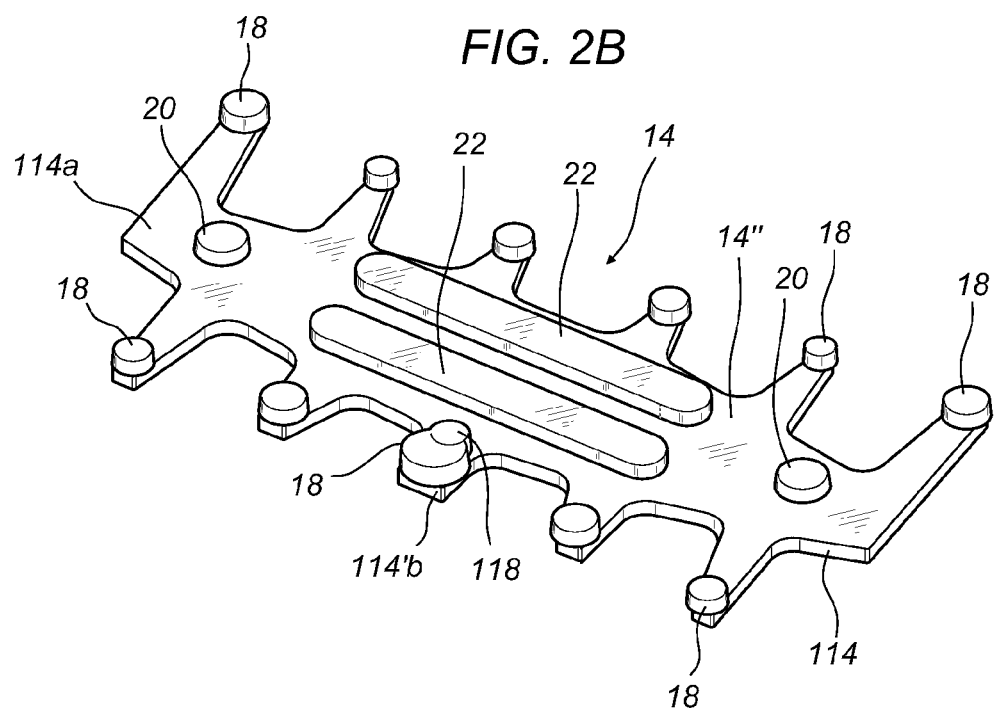
FIG. 2B is a bottom perspective view of only the preferred embodiment of the secondary or product engagement member used in the link according to the invention.
Figure 2C:
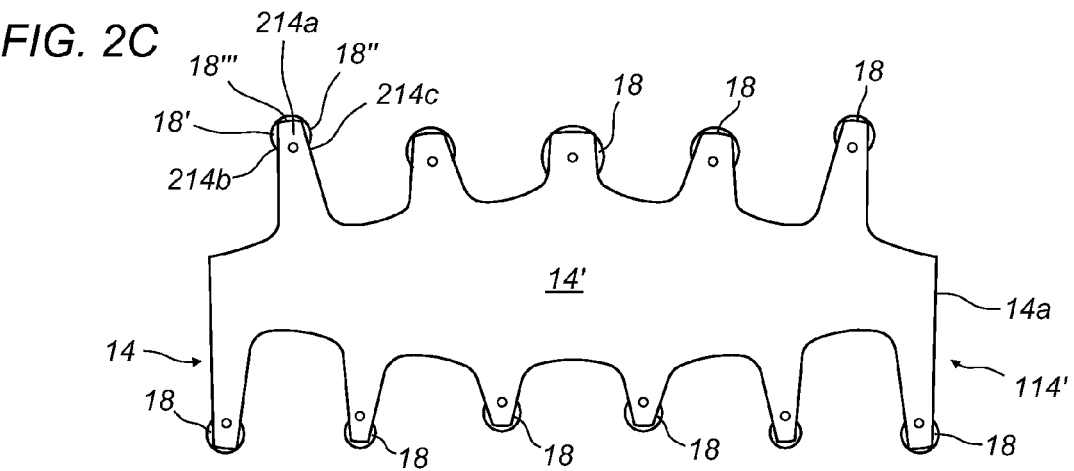
FIG. 2C is a top plan view of the secondary or product engagement member used in the link according to the invention.

In particular, as may be inferred from FIG. 2C, the protruding means 18 at the respective longitudinal protrusion 114b, 114c have a first and a second portion 18', 18" which extend from the respective latching portion 18bb and which protrude from the respective lateral edge 214b, 214c of the respective secondary or product engagement member 14.

As may be inferred in particular from FIG. 2C, the protruding means 18 at the respective longitudinal protrusion 114b, 114c are provided with a protruding portion 18''' which extends from the respective latching portion 18bb and from a respective transversal end face 214a of the free end of the corresponding longitudinal protrusion of the secondary or product engagement member 14.

In practice, as may be inferred in particular from FIG. 2C, especially for the protruding means 18 at the respective longitudinal protrusion 114b, 114c, the respective latching portion 18bb has, extending from it, a first, a second and a third portion 18', 18", 18''', which protrude, respectively, from the respective lateral edge 214a, 214b, 214c of the secondary or product engagement member 14.

Figure 2D:
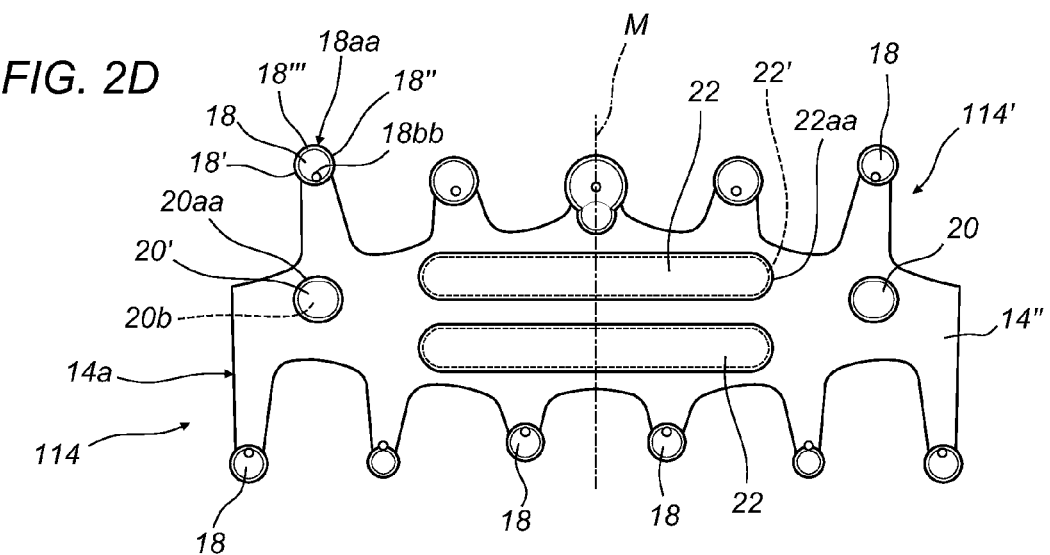
FIG. 2D is a bottom plan view of the secondary or product engagement member used in the link according to the invention.
Figure 2E:
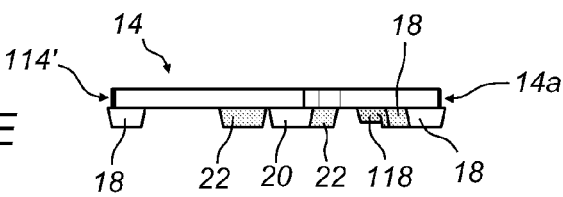
FIG. 2E is a front view of the secondary or product engagement member used in the link according to the invention.
Figure 2F:
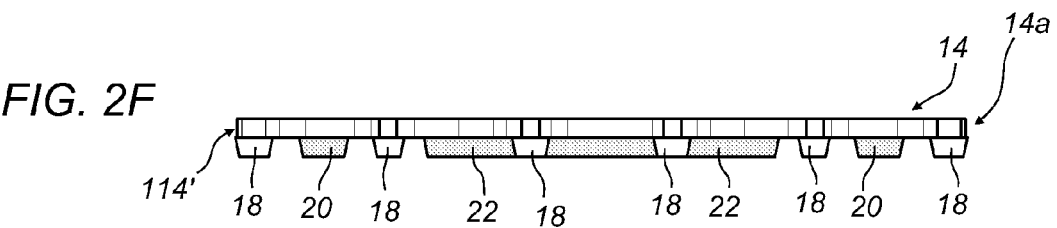
FIG. 2F is a side view of the secondary or product engagement member used in the link according to the invention.

In practice, as may be inferred in particular from FIG. 2D, especially for the protruding means 18 at the respective longitudinal protrusion 114b, 114c, the respective latching portion 18bb extends in the direction of the main transversal part 114a of the secondary or product engagement member 14, upstream of the respective protruding lateral portion 18', 18", defining a large block for latching to the secondary or product engagement member.

In practice, a protruding retaining portion 18aa (18', 18", 18''') is thereby defined which is peripherally widened and which protrudes for at least part of the respective perimeter profile, in such a way as to define particularly effective protruding means for fastening to the main supporting member of the link.

Thus provided is a plurality of protruding fastening portions 18 which are received in corresponding sockets 19 formed in the main link member 12, at respective ends of the longitudinal protrusions of the secondary member 14.

In particular, as illustrated, protruding fastening portions 18 are provided which are received in respective sockets 19 formed in the main link member 12, at all the longitudinal protrusions, both front and rear, of the secondary member 14.

As may be inferred in particular from FIGS. 1A and 2A, grip means 30 are provided on the secondary or product engagement member 14 for gripping the selfsame secondary or product engagement member 14, in particular to allow the secondary or product engagement member 14 to be treated or handled during the moulding of the link.

The grip means for the secondary or product engagement member 14 comprise one or more holes 30 which are made in the secondary or product engagement member 14 and which extend, in particular perpendicularly, into it.

Advantageously, the grip means or holes 30 for the secondary member 14 are provided at the respective fastening means 18, 20 for fastening the secondary or product engagement member 14 to the main link member, thereby allowing the secondary or product engagement member 14 to be easily extracted from its mould.

Advantageously, the grip means 30 for the secondary member 14 are accessible on the perpendicular side of the secondary or product engagement member opposite that from which extend the fastening elements or means 18, 20 by which the secondary or product engagement member 14 is hooked to the main link member 12.

In particular the grip holes 30 lead out of, or give onto, the perpendicular side of the secondary or product engagement member 14 opposite that from which extend the fastening elements 18, 20 by which the secondary or product engagement member 14 is hooked to the main link member 12.

Advantageously, each grip hole 30 extends perpendicularly for a certain stretch, in particular for the full perpendicular extension or thickness of the secondary or product engagement member 14.

Figure 4A:
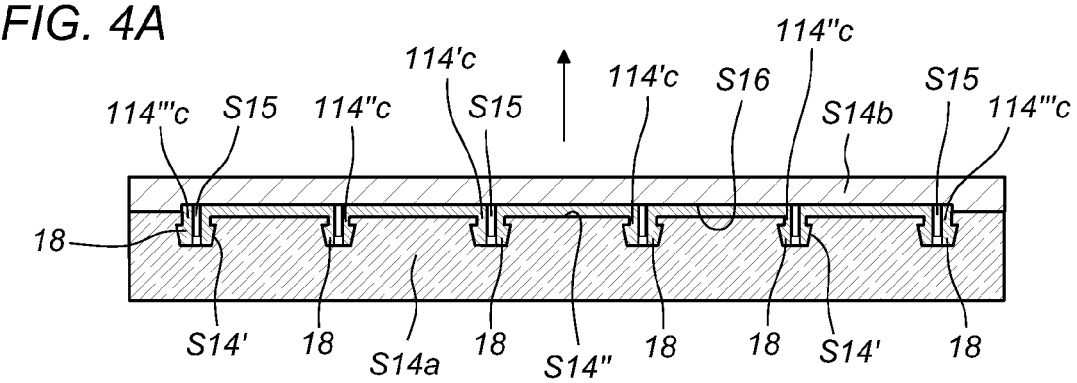
FIGS. 4A to 4C illustrate in schematic cross sections of the respective moulds, the different steps of a preferred process for making a link according to the invention.
Figure 4B:
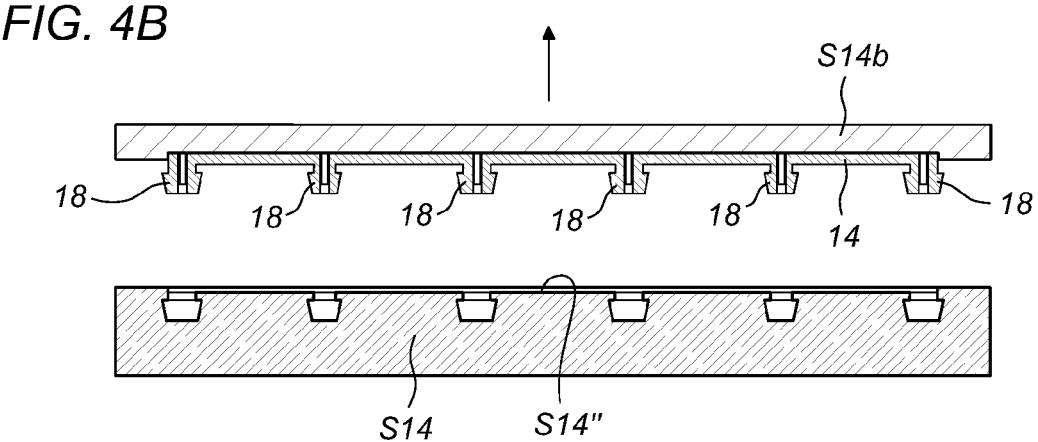
Figure 4C:
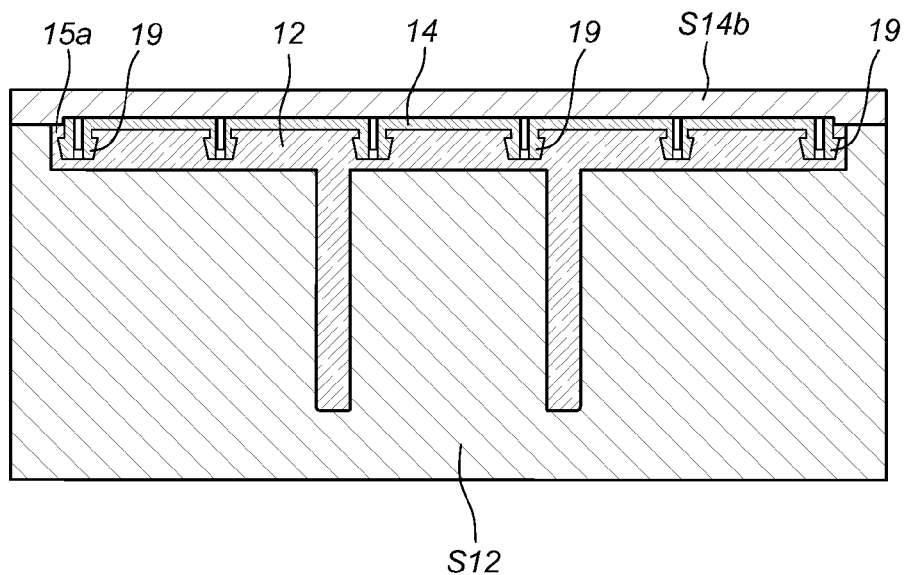

The grip holes 30 on the secondary or product engagement member 14 are also adapted to receive corresponding insertion means which are in the form of pin-like, or needle-like, members S15, illustrated in FIGS. 4A to 4C, and which extend, from a respective supporting element S14a, in particular defined by a portion of the mould used for making the additional element 14, as will become clearer as this description continues.

Further, the fastening element 18 on the front central portion of the secondary member 14 has a secondary portion 118, which extends rearwardly from the primary portion 18aa of the fastening element itself and is smaller in height or perpendicular extension than the main portion 18aa.

The rearwardly extended portion 118 is completely under the longitudinal protrusion and fits into a corresponding rear portion 119 of the socket 19, which also extends under the bottom 15b of the cavity 15, and which defines respective undercut means, in the form of a respective transversal or longitudinal surface 119a, in particular parallel to the lower face 14" of the transversal plate 114, that is, preferably horizontal.

Figure 1D:
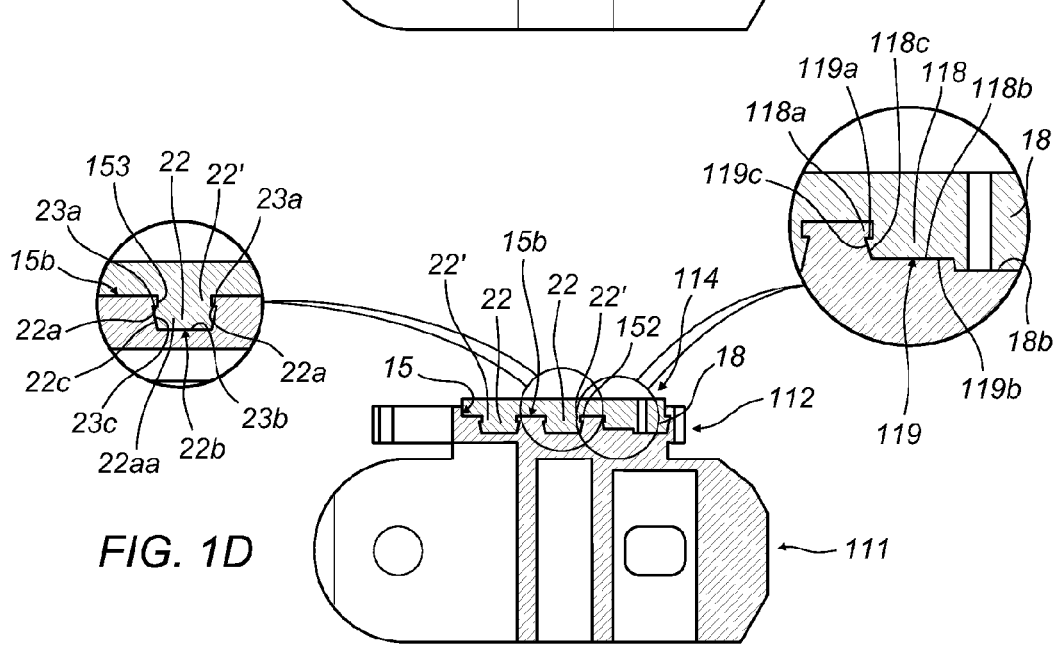
FIG. 1D is a cross section of the preferred embodiment of the link according to the invention, through the line ID-ID of FIG. 1A.

Further, as may be inferred from FIGS. 1D and 3, the rear fastening portion has a respective, downwardly converging peripheral surface 118c, which joins the upper, undercut surface 118a to a corresponding lower surface 118b, parallel to the surface 118a and positioned above the surface 18c of the main part of the protrusion 18.

Similarly, the socket portion 119, also has a downwardly converging peripheral surface 119c, which joins the upper, undercut surface 119a to a corresponding lower surface 119b, parallel to the surface 119a and positioned above the surface 19c of the main part of the socket 19. The socket 119 mates with the profile of the secondary retaining portion 118.

Further, as may be inferred from FIGS. 1D and 3, the undercut surface 119a extends circumferentially between opposite lateral faces of the main portion 18aa.

As illustrated, the rearwardly extending undercut face 118a is perpendicularly spaced from the lower face 14" of the primary part of the secondary member 14.

FIGS. 4A to 4C illustrate a preferred embodiment of a process for making the above described link 10.

Advantageously, this process comprises making a secondary or product engagement member 14, comprising corresponding protruding means 18, 20, 22 defining respective fastening means on the secondary or product engagement member 14, and then making the main link supporting member 12 in contact with the secondary or product engagement member 14, in such a way as to obtain in the main link supporting member 12 at least one, and in particular a plurality of corresponding sockets 19, 21, 23 for housing the protruding means and defining corresponding perpendicular retaining undercut means for holding the secondary or product engagement member 14 to the selfsame main link supporting member 12.

In practice, as may be well inferred from FIG. 4A, first the secondary or product engagement member 14 is made by moulding the respective material, in particular the respective elastomeric material, in a specific mould S14*a*, S14*b*.

In particular, as illustrated, the mould for the secondary or product engagement member 14 has a first and a second half mould S14*a*, S14*b*, opposite to each other, and between which the material used for making the secondary or product engagement member 14 is inserted and moulded.

Advantageously, the mould, in particular the respective first half mould S14*a* for the secondary or product engagement member 14 has one or more respective sockets S14' which are perpendicularly recessed relative to a transversal surface S14" defining the lower face of the secondary or product engagement member 14, that is, of the main portion 114 thereof, and has a respective undercut which defines corresponding protruding means 18, 20, 22, in particular, as mentioned above, for fastening the secondary or product engagement member 14.

The mould, in particular the respective second half mould S14*b* for the secondary or product engagement member 14 has one or more respective pin-like, or needle-like, members S15 which extend, in particular perpendicularly, from the face S16 of the half mould S14*b* which defines the upper face 14' of the secondary or product engagement member 14 to make corresponding grip means for the selfsame secondary or product engagement member 14.

In practice, the mould S14*a*, S14*b* for making the secondary or product engagement member 14, in particular, the half moulds S14*a*, S14*b* are shaped and adapted, in particular the sockets S14' of the respective half mould S14*a* are shaped and adapted in such a way as to make a secondary or product engagement member 14 like the one described above.

As may be inferred from FIG. 4B, after having moulded or made the secondary member 14, the selfsame secondary member 14 is extracted from the mould, in particular from the respective first half mould S14*a*.

Extraction is accomplished by moving the second half mould S14*b* away from the first half mould S14*a*, in particular in the perpendicular direction.

During the extraction step, the elasticity of the material of the secondary member 14 allows the protruding means 18, 20, 22 of the secondary or product engagement member 14 to come out of the respective undercut sockets S14' made in the first half mould S14*a*.

At this point, the secondary or product engagement member 14 thus made is moved to the mould S12 to make the main supporting member 12 of the link.

In particular, the secondary or product engagement member 14 is moved to the mould S12 to make the main link supporting member 12 using the half mould S14*b*, which has already been used to make the secondary or product engagement member 14.

At this point, the main link supporting member 12 is made by moulding the respective plastic material in a specific mould S12 in contact with the secondary or product engagement member 14, in particular in contact with the lower part and the lateral part thereof, and that is, in contact with the respective protruding means 18, 20, 22.

Thus made, in particular from rigid or substantially rigid plastic material, is a main link supporting member 12 comprising respective sockets 19, 21, 23 which are perpendicularly recessed and which define corresponding undercut retaining means for holding the protruding means 18, 20, 22 of the secondary or product engagement member 14, that is, for holding the secondary or product engagement member 14 to the main supporting member 12 of the link.

The mould S12 is also adapted to define a main supporting member 12 having a corresponding edge 15*a* which peripherally bounds the secondary or product engagement member 14 which, moreover, protrudes above the edge 15*a*.

In practice, the mould S12 for making the main supporting member 12 of the link is designed and shaped in such a way as to make a main link supporting member 12 like the one in the above description of the preferred embodiment of the link.

Next, the link thus made is removed from the mould S12 and extracted from the half mould S14*b*.

The invention described above is susceptible of industrial application. It would be obvious to one skilled in the art that several changes and modifications can be made to the invention without departing from the spirit and scope of the invention, described in depth above. In particular, one skilled in the art could easily imagine further embodiments of the invention comprising one or more of the features described herein. It will also be understood that all the details of the invention may be substituted for technically equivalent elements.

The invention claimed is:

1. A link (10) usable in a conveyor belt of the type with articulated links, the link (10) having a main link supporting member (12), in particular of plastic material, more specifically a rigid or substantially rigid material, and a secondary or product engagement member (14), in particular of elastically compliant material, preferably an elastomeric material, and in particular defining a product supporting member (14) having a corresponding surface (14') for supporting the product to be conveyed; the secondary or product engagement member (14) being held to the main link supporting member (12) by respective fastening means on the secondary or product engagement member (14) and on the main link supporting member (12), respectively, wherein the fastening means comprise, on the secondary or product engagement member (14), corresponding protruding means (18, 20, 22) adapted to be inserted into a respective socket (19, 21, 23) formed in the main link supporting member (12) and defining corresponding perpendicular retaining undercut means for holding the secondary or product engagement member (14) to the main link supporting member (12), wherein the secondary or product engagement member (14) is housed in a cavity (15) of the main link supporting member (12) defined by a respective internal perimeter edge (15*a*) and a bottom surface (15*b*) which is recessed relative to the external upper surface (12') of the main link supporting member (12), the secondary or product engagement member (14) preferably having a peripheral edge (14*a*) which mates with the corresponding internal edge (15*a*) delimiting the housing cavity (15), and wherein the respective socket (19, 21, 23) on the main link supporting member (12) extends perpendicularly to a height below the level of the bottom face (15*b*) of the cavity (15) of the main supporting member which houses the secondary or product engagement member (14).

2. The link according to claim 1, wherein the retaining socket (19, 21, 23) on the main link supporting member (12) has a corresponding face (19*a*, 21*a*, 23*a*) which is recessed relative to a corresponding upper edge (15*a*, 151, 152), extending along a longitudinally and/or transversely extended plane, in particular horizontally extended, and which is adapted to define corresponding undercut means.

3. The link according to claim 1, wherein the respective retaining socket (19, 21, 23) on the main link supporting member (12) has an upper, undercut surface (19a, 21a, 23a) and a lower, underside surface (19b, 21b, 23b), which are, in particular in contact respectively with a corresponding upper surface (18a, 20a, 22a) and lower surface (18b, 20b, 22b) of corresponding protruding fastening means on the secondary or product engagement member (14); the upper, undercut surface (19a, 21a, 23a) and the lower, underside surface (19b, 21b, 23b) being connected to each other by a corresponding surface (19c, 21c, 23c), the latter peripheral surface mating with the profile of a corresponding peripheral surface (18c, 20c, 22c) of the corresponding protruding fastening means on the secondary or product engagement member (14) of the link.

4. The link according to claim 1, wherein the secondary or product engagement member (14) has a main transversely widened part (114a) and a plurality of front and rear longitudinal protrusions (114b, 114c) which are longitudinally offset from each other, wherein fastening means are provided which comprise the respective protruding means (18) provided at the free end of a longitudinally protruding portion (114b, 114c) of the secondary or product engagement member (14), and wherein fastening means are provided which comprise a respective socket (19) provided on the main link supporting member (12), in particular, at a respective longitudinal protrusion (112b, 112c) thereof.

5. The link according to claim 4, wherein the fastening means comprise respective protruding means (20) provided on the main transversely extended part (114a) of the secondary or product engagement member (14), in particular near a respective corner portion (S', S'), especially at the front and lateral edge of the main transversely extended part (114a) of the secondary or product engagement member (14), and wherein the respective socket (21) of the fastening means is provided on the main transversely extended part (112a) of the plate (112) of the main link supporting member (12), in particular near a respective corner portion, especially at the front and lateral edge of the main transversely extended part (112a) of the plate (112) of the main supporting member (12).

6. The link according to claim 4, wherein the fastening means comprise respective protruding means (22) which are provided on the main transversely extended part (114a) of the secondary or product engagement member (14) and which are in the form of a transversely elongate portion, and wherein the respective socket (23) of the fastening means extends transversely and is provided on the main transversely extended part (112a) of the plate (112) of the main link supporting member (12).

7. The link according to claim 4, wherein the protruding means (18, 20, 22) comprise at least one protruding fastening portion (18aa, 20aa, 22aa) and a corresponding latching portion (18bb, 20', 22') for latching to the main portion (114') of the secondary or product engagement member.

8. The link according to claim 7, wherein the latching portion (18bb) extends under the free end of the corresponding protruding end portion (114b, 114c) of the secondary or product engagement member (14) to be retained.

9. The link according to claim 7, wherein the protruding fastening portion (20aa) extends radially from the latching portion (20').

10. The link according to claim 7, wherein the protruding fastening portion (20aa, 22aa, 118) is perpendicularly spaced from the lower face (14") of the main part of the secondary or product engagement member (14).

11. The link according to claim 7, wherein the respective latching portion (18bb) extends in the direction of the main transversely widened part of the secondary or product engagement member (14), upstream of the respective protruding lateral portion (18', 18").

12. The link according to claim 4, further comprising a plurality of protruding fastening elements at respective ends of the front and rear longitudinal protrusions of the secondary or product engagement member.

13. The link according to claim 1, wherein the protruding fastening means (18, 20) extend circumferentially.

14. The link according to claim 1, wherein the protruding means comprise at least a first and a second portion (18', 18") protruding from the respective lateral edge of the secondary or product engagement member (14).

15. The link according to claim 14, wherein the respective protruding portion (18', 18") extends from a respective lateral face of a corresponding longitudinal protrusion of the secondary or product engagement member (14), in particular from first and second, opposite lateral faces of the corresponding longitudinal protrusion of the secondary or product engagement member (14).

16. The link according to claim 1, wherein the protruding means comprise a respective protruding portion (18''') extending from a respective transversal end face of a corresponding longitudinal protrusion of the secondary or product engagement member (14).

17. A link (10) usable in a conveyor belt of the type with articulated links, the link (10) having a main link supporting member (12), in particular of plastic material, more specifically a rigid or substantially rigid material, and a secondary or product engagement member (14), in particular of elastically compliant material, preferably an elastomeric material, and in particular defining a product supporting member (14) having a corresponding surface (14') for supporting the product to be conveyed; the secondary or product engagement member (14) being held to the main link supporting member (12) by respective fastening means on the secondary or product engagement member (14) and on the main link supporting member (12), respectively, wherein the fastening means comprise, on the secondary or product engagement member (14), corresponding protruding means (18, 20, 22) adapted to be inserted into a respective socket (19, 21, 23) formed in the main link supporting member (12) and defining corresponding perpendicular retaining undercut means for holding the secondary or product engagement member (14) to the main link supporting member (12), wherein fastening means are provided which comprise the respective protruding means (18) extending outwardly relative to the peripheral edge of the secondary or product engagement member for insertion into a corresponding socket (19) which is provided on the main link supporting member (12) and which, in particular, is recessed relative to an internal edge (15a) delimiting a respective housing cavity (15) for the secondary or product engagement member (14).

18. A process for making a link (10) usable in a conveyor belt of the type with articulated links, the link (10) having a main link supporting member (12), in particular of plastic material, more specifically a rigid or substantially rigid material such as acetalic resin, polyamide, and a secondary or product engagement member (14), in particular of elastically compliant material, preferably an elastomeric material, and in particular defining a product supporting member (14) having a corresponding surface (14') for supporting the product to be conveyed; in particular, the secondary or product engagement member (14) being held to the main link supporting member (12), in particular by respective fastening means on the secondary or product engagement member (14) and on the main link supporting member (12), respectively; further comprising making a secondary or product engagement member (14), in particular comprising corresponding protruding means (18, 20) defining respective fastening means on the secondary or product engagement member (14), and making the main link supporting member (12) in contact with the secondary or product engagement member (14), in particular in such a way as to obtain in the main link supporting member (12) at least one corresponding socket (19, 20) for housing the protruding means, especially defining corresponding perpendicular retaining undercut means for holding the secondary or product engagement member (14) to the main link supporting member (12).

19. The process according to claim 18, further comprising making the secondary or product engagement member (14) by moulding the respective material in a specific mould (S14a, S14b), in particular in first and second half-moulds (S14a, S14b), in particular placed opposite each other.

20. The process according to claim 18, wherein the mould, in particular the respective first half-mould (S14a) for the secondary or product engagement member (14) has one or more respective sockets (S14') which are perpendicularly recessed relative to a transversal surface (S14") defining the lower face of the secondary or product engagement member (14) and defining a respective undercut which defines corresponding protruding fastening means of the secondary or product engagement member (14).

21. The process according to claim 18, wherein the mould, in particular the respective second half-mould (S14b) for the secondary or product engagement member (14) has one or more respective members (S15) which extend, in particular perpendicularly, from the face (S16) of the mould (S14b) which defines the upper face of the secondary or product engagement member (14) to make corresponding grip means for the secondary or product engagement member (14).

22. The process according to claim 18, further comprising extracting the secondary or product engagement member (14) from the mould, in particular from the respective first half-mould (S14a), preferably by moving the second half-mould (S14b) away from the first half-mould (S14a), in particular perpendicularly.

23. The process according to claim 18, further comprising carrying the secondary or product engagement member (14) to the mould (S12) in order to make the main link supporting member (12), in particular by using the half-mould (S14b) to make the same secondary or product engagement member (14).

24. The process according to claim 18, further comprising making the main link supporting member (12) by moulding the respective plastic material in a specific mould (S12) in contact with the secondary or product engagement member (14), in particular in contact with the lower part thereof, and more specifically in contact with the respective protruding means (18, 20, 22) and with the lower face of the main transversely extended portion thereof in order to make a main link supporting member (12) which has at least one respective socket (19, 21, 23) defining corresponding undercut retaining means.

\* \* \* \* \*